June 23, 1970    K. THADDEY    3,516,741
APPARATUS FOR MAKING PRINTS FROM COLOR NEGATIVES
Filed May 22, 1968    2 Sheets-Sheet 1

Inventor
Kurt Thaddey

By Pierce, Scheffler & Parker
Attorneys

June 23, 1970     K. THADDEY     3,516,741
APPARATUS FOR MAKING PRINTS FROM COLOR NEGATIVES
Filed May 22, 1968     2 Sheets-Sheet 2
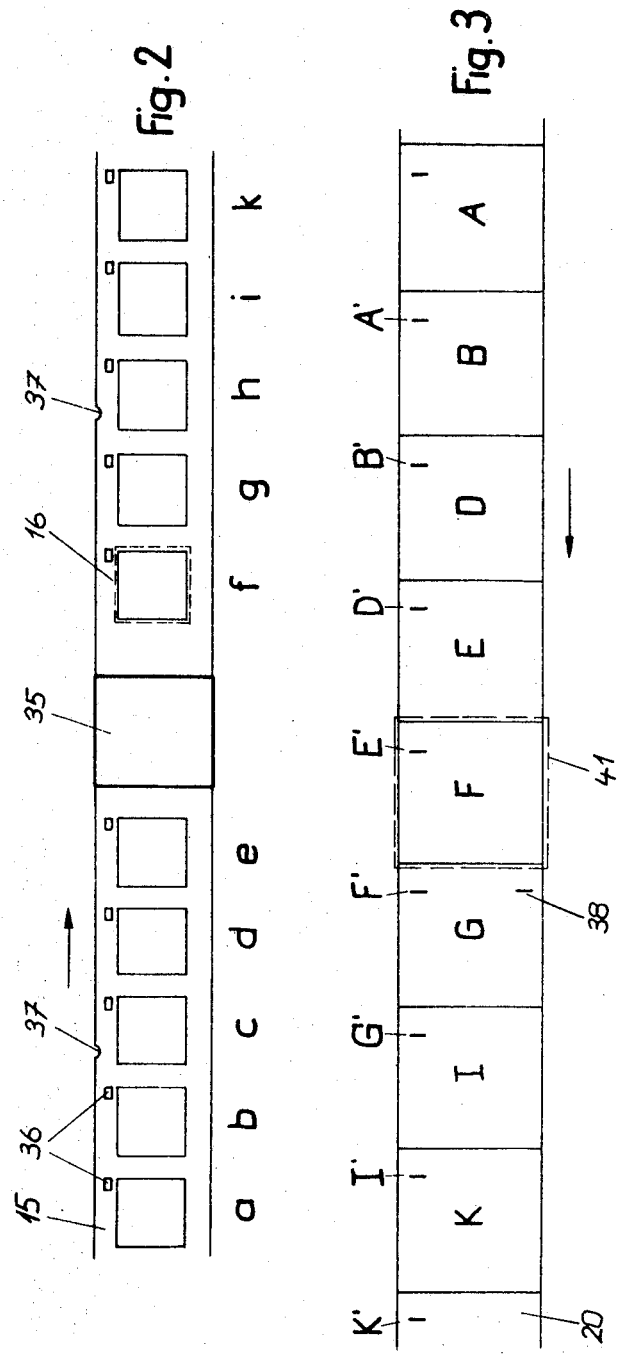
Inventor
Kurt Thaddey

United States Patent Office 3,516,741
Patented June 23, 1970

3,516,741
APPARATUS FOR MAKING PRINTS FROM COLOR NEGATIVES
Kurt Thaddey, Buchs, Zurich, Switzerland, assignor to Ciba Limited, Basel, Switzerland, a company of Switzerland
Filed May 22, 1968, Ser. No. 731,008
Claims priority, application Switzerland, May 31, 1967, 7,732/67
Int. Cl. G03b 27/04
U.S. Cl. 355—88     8 Claims

ABSTRACT OF THE DISCLOSURE

Positive print paper (in web form) is exposed to a series of color negatives in an automatic printing machine having a device for measuring the brightness of the negatives to control their exposures and prevent exposure of any negative measured as unprintable. Such negatives are marked. The developed prints are successively inspected in synchronism with a second passage of the negatives through the printing machine whereby the negative corresponding to any unsatisfactory print can be re-exposed. Exposure correction keys operable by the inspector are provided. Negatives marked as unprintable are detected and fed straight through the exposure station of the printing machine in the second passage of the negatives to maintain synchronism between the exposed negatives and their corresponding prints.

---

This invention relates to apparatus for making prints from color negatives. To make the prints, the color negatives are exposed on positive printing paper in a machine known as a printer and the invention is concerned with the matter of inspecting the prints and re-exposing those negatives from which unsatisfactory prints have been made with a corrected exposure based on the assessment made of the unsatisfactory print.

For printing color negatives machines conventionally referred to as printers or printing machines are used. Such machines contain means for measuring the brightness of each negative and for automatically controlling the exposure accordingly. Such printers have been operated in the past by a person inspecting the negative presently in the printing frame for the purpose of correcting the shutter speed by the operation of keys when a correction appears to be necessary and feeding the next negative on the film into printing position after the print of the previous negative has been made. Negatives which cannot be printed because they have been under- or overexposed can be omitted by immediately feeding them out of the printing frame without the shutter having been operated. Despite this assessment of the negative in the picture frame by a skilled person it is still necessary to view the resultant prints in order to eliminate unsatisfactory prints and to repeat the exposure of the corresponding negatives at corrected shutter speeds.

Numerous proposals have already been made to improve and complete the automation of the process of printing color negatives and to simplify the procedure. In this context it has been suggested to join together the ends of a plurality of films received from different customers to form a continuous film or web from which prints can be consecutively made on a long positive paper web and to facilitate the subsequent collation of the negatives with the corresponding prints. It has also been proposed to position the negatives of the film automatically in the printing frame and for this purpose to provide the film with perforations which are positionally related to the individual negative pictures. Another proposal consists in automatically picking out negatives that are unsuitable to be printed and to omit these, likewise automatically, during the printing process. In order to reduce the number of unsatisfactory copies it has further been proposed, in conjunction with an automatic measurement of the brightness of the negative also automatically to measure differences in the brightness, contrasts and special motifs in a picture and to utilize this information for controlling the exposure time.

The degree of automation and the nature of the apparatus provided call for differences in procedure. For instance negative films that have been joined together to form a continuous long band are conveyed across a viewing window on an inspection table, films lacking positioning holes being provided with such holes with a punch and corrections of exopsure which a person viewing the pictures considers to be necessary being punched on a separate correction tape which is later fed through the printer together with the negative film and which causes the pictures in question to be submitted to an automatically corrected exposure. Moreover, the corrective data are printed on the back of the positive print. After the prints on the paper film have been developed they are individually viewed by an inspector at a viewing table, the data on the backs of the prints which have been subjected to a corrected exposure being visible in a mirror and any further correction being punched on a second correcting tape and the faulty print marked. The negative film is then fed a second time through the printer together with the second correcting tape, but this time only those negatives which require further correction are printed again, whereas prints that are already satisfactory are not re-exposed. The prints that have been marked as being unsatisfactory must be eliminated from the positive paper film when this is cut and the prints thus removed must be replaced by the corresponding prints appearing on the second positive film. For despatch to the customer the positive prints must then be correlated with the pictures on the corresponding negative film.

In a different arrangement of which I am aware, a viewing device for inspecting the negatives is built into the printer where an operator can key any corrections required into an electronic exposure control means. These corrections are not stored. If the print which is again checked by an inspector sitting at a viewing table proves to be unsatisfactory the required further corrections are endorsed directly on the print which is marked as being faulty. Independently of this check the negative film and the positive paper film are cut and the prints collated with the negatives. If prints are to be repeated the marked prints and the negative film are again fed through the printer where the same operator must then carry out the corrected exposure as endorsed on the print.

Such procedures are complicated and they make considerable demands upon the memory, attention, reliability and experience of the operating personnel.

The present invention now provides apparatus for making prints from color negatives comprising a printing machine having an exposure station for exposing a series of color negatives on positive printing paper in a first passage of said color negative series through the machine, means at said exposure station for effecting exposure of said printing paper to each color negative for selected colors, means responsive to the brightness of each color negative presented at the exposure station coupled to said exposure means to control the exposures of said selected colors and to prevent exposure of a color negative measured as unprintable; and an inspection arrangement including a viewing station for examining the prints made from said color negatives, means for feeding said prints stepwise past the viewing station in synchronism with the passing of the corresponding color negatives a second time through the printing machine for re-exposure at said exposure station of any of said color negatives from which unsatisfactory prints have been made, means responsive to the arrival of an unprintable color negative at said exposure station to cause such negative to be fed straight through the exposure station, manually-operable means coupled to said exposure control means to supply exposure correction information thereto in accordance with the assessment made of an unsatisfactory print, said manually-operable means being actuable to cause a corrected exposure of the color negative presently at the exposure station, and means for checking the synchronism of feeding of the prints to the viewing station with the second passage of the color negatives through the printing machine.

In order that the invention and the manner of putting it into practice may be better understood an embodiment thereof will now be described, by way of example, with reference to the accompanying drawings in which:

FIG. 2 shows a portion of a continuous negative film and

FIG. 3 shows a corresponding portion of the positive printing film.

Figure 1:
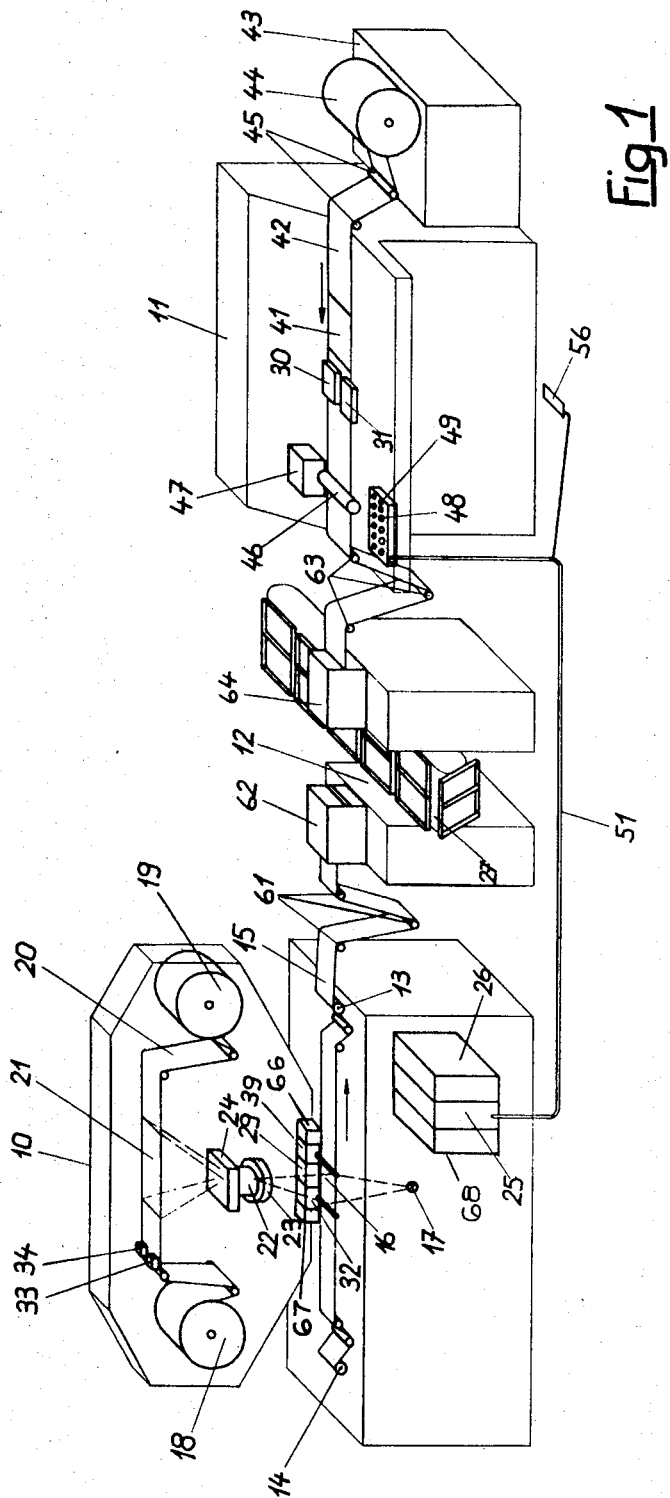
FIG. 1 is a simplified, diagrammatic view of the apparatus embodying the invention.

In the apparatus illustrated in FIG. 1 only those parts necessary to an understanding of the present invention are shown. The apparatus comprises a printing machine 10 and a viewing table 11. Between the printing machine and the viewing table is a collating table 12. The equipment is shown during the inspection of the prints made on a web or film of positive paper and the collation and completion of consecutive printing orders for despatch. But firstly the apparatus will be described in relation to the making of the prints prior to inspection.

The pedestal of the printing machine carries two spools 13 and 14 for transporting and winding film. During a first passage through the machine a negative film 15 comprised of a series of color negatives joined together runs from the spool 13 through a frame 16 at an exposure station to the winding-on spool 14. The film 15 conveniently comprises a number of individual negative films from different customers joined end-to-end. Below the frame 16 is a light source 17 for exposing the negatives. The upper part of the printing machine contains two spools 18 and 19 for transporting and winding the film of positive printing paper. For making the prints the paper 20 is unwound from the spool 18 on the left, advanced through the printing area 21 and rewound on the spool 19 on the right, the drive for the positive paper being dependent on the feeding and exposure of the film 15.

Mounted between the frame 16 and the printing area 21 of the exposure station is an objective 22 associated with a brightness measuring device 23 which is responsive to the brightness of the color negatives by reference to which a color filter shutter 24 is electronically controlled. An electronic control means 25 which is coupled to the brightness measuring device responds to the signals generated thereby and controls the speed of the shutter 24 for each color component (normally the primary colors are selected). The printing machine 10 also contains a film feed mechanism 29 which is automatically started when an exposure has been made and which is stopped when a negative is correctly positioned in the picture frame 16. Correct positioning is effected by a perforation detector 39 which responds to positioning holes provided in the negative film 15 described more fully below.

The printing machine is also provided with marking means 32 adjacent the picture frame 16. These marking means are controlled by the brightness measuring device 23 to mark those negatives which are measured by the brightness measuring device 23 as being unprintable and cause the feed mechanism 29 to advance the film to the next picture. A second marking means 33 is provided adjacent the printing area 21 to apply to the back of the positive paper film 20 a picture end mark for each print and a third marking means 34 is provided adjacent marking means 33 to mark the back of the positive paper film 20 to indicate the end of each individual negative film by reference to the joints where consecutive individual negative films have been stuck together, thereby permitting the printed film to be correctly divided up for despatch. The marking means 34 is controlled by a film joint detector 66. The printing process is fully automatic and proceeds without human assistance.

As above indicated the negative film 15 is joined together from individual lengths of film before it enters the printing machine. FIG. 2 is a portion of such a film after the first printing operation has been performed. The illustrated section of film 15 comprises a joint 35 and negatives $a$ to $e$ of one film and negatives $f$–$k$ of another film. Associated with each negative on the margin of the film is a positioning hole 36 which stops the film feed when the negative is in correct register in the frame 16. During the first passage of the film through the printer the measurement of the brightness of the negatives has proved the negatives $c$ and $h$ to be unprintable and they have therefore been provided with a non-print mark 37. On the positive printing paper 20, as shown in FIG. 3, the prints A, B, D, E, F, G, I, K corresponding to the negatives $a$, $b$, $d$, $e$, $f$, $g$, $i$, $k$ are therefore obtained consecutively. The back of each print bears a picture end mark A', B' . . . made by the marker 33 and where the joint 35 was situated there is a film endmark 38 made by the marker 34.

Turning now to the inspection of the prints made from the previously exposed positive paper 20, which is the stage of the procedure shown in FIG. 1, the inspection arrangement for the prints and the means for making a further exposure of the negatives of unsatisfactory prints will now be described.

The viewing table 11 contains a viewing window 41 across which the developed positive paper film is fed stepwise for the individual pictures to be viewed and assessed. The positive paper film carrying the prints is here referenced 42. A magazine holder 43, upon which a magazine 44 with the developed positive film is mounted, is supported on the viewing table with guide rollers 45 and 46 for the film 42, driven by a paper feed mechanism 47. A picture end mark detector 30 and a film end mark detector 31 are located adjacent to the window 41 for establishing that the film 42 and re-cycled negative film 15 are in synchronization with a corresponding print and color negative at the window 41 and frame 16 respectively at the same time. The viewing table is further provided with a set of keys 48 for supplying exposure correction information to control unit 25 and an exposure release key 49 for manually controlling the exposures in the printer, as well as a picture feed key which conveniently has the form of a foot pedal 56. These keys are connected to means 25 for controlling the color shutter 24 in the printer 10 by a cable 51.

As the positive paper film 42 runs past the viewing table 11, the negative film 15 passes a second time through the printer 10 from the spool 14. If the print presently at the viewing table appears to be unsatisfactory it is marked as being unsuitable, for instance it may be crossed out, and it is then printed again immediately by re-exposing the corresponding color negative presently at the exposure station. The person inspecting the pictures presses one of the exposure correcting keys 48 in accordance with his assessment of the unsatisfactory print. The pressing of a key 48 changes the shutter speed of the printer and, by then pressing the shutter release 49, the inspector operates the color filter shutter 24. The films 42 and 15 are advanced stepwise in synchronism from picture to picture by the foot pedal 56.

The collation table 12 between the printing machine 10 and the viewing table 11 is provided with guide rollers 61 for the negative film 15 which enters from one side after having passed through the printer a second time and cutting means 62 which cut the film as required for packing. The positive film 42 which enters over guide rollers 63 from the other side is likewise presented to cutting means 64 which by reference to the picture end marks on the back of the positive film automatically cut off the individual pictures. The positives arrive at the collation able 12 in synchronism with the corresponding negatives and can be filled by an operator into bags for despatch. The bags are conveyed across the direction of feed of the negative and positive films on a conveyor system 27. When an individual order contains pictures that have been marked faulty, this order is retained until the second developed positive paper film containing the corrected prints is available. These corrected prints are included in the retained bags which are then ready for despatch.

For a synchronous feed of the negative film 15 through the printer 10 and of the positive paper film 42 across the viewing table 11, a synchronizing device 26 is provided containing means which co-operate with the negative film feed 29 and the paper feed 47 to keep the two in synchronism. This is achieved by a starting pulse from the synchronizing device 26 which is generated when the foot pedal 56 is depressed causing both feeds to start simultaneously, the film feed 29 being stopped by the detection of the next picture positioning hole by detector 39 when the associated negative is in register with the frame 16 and the paper feed 47 being stopped by the next picture end mark detected by detector 30 when the print appears in the viewing window 41. When a negative measured as unprintable in the first passage of the film 15 arrives in the frame 16, a sensing device 67 detects this negative and is coupled to the film feed 29 to prevent it from stopping in response to the positioning hole 36 of this negative. The feed mechanism 29 therefore continues to transport the film until a negative appears in the frame that can be printed. This will then again correspond with the positive print that has appeared in the viewing window on the viewing table. The maintenance of synchronism is checked from time to time by the fact that a joint 35 and an order end mark 38 must coincide and be simultaneously detected by the detector 66 and the detector 31 at the viewing station 41. These detectors are coupled to a gate circuit 68 so arranged that if these two marks coincide as required a fault signal is prevented from being generated. In the event of non-coincidence this fault signal is generated and indicates to the person at the viewing table that correspondence of the negative film with the positive print film must be restored.

The apparatus described above permits the working operations for the printing of color negatives to be further automated and simplified and enables operating and labor costs to be reduced.

What is claimed is:

1. Apparatus for making prints from color negatives comprising a printing machine having an exposure station for exposing a series of color negatives on positive printing paper in a first passage of said color negative series through the machine, means at said exposure station for effecting exposure of said printing paper to each color negative for selected colors, means responsive to the brightness of each color negative presented at the exposure station coupled to said exposure means to control the exposures of said selected colors and to prevent exposure of a color negative measured as unprintable; and an inspection arrangement including a viewing station for examining the prints made from said color negatives, means for feeding said prints stepwise past the viewing station in synchronism with the passing of the corresponding color negatives a second time through the printing machine for re-exposure at said exposure station of any of said color negatives from which unsatisfactory prints have been made, means responsive to the arrival of an unprintable color negative at said exposure station to cause such negative to be fed straight through the exposure station, manually-operable means coupled to said exposure control means to supply exposure correction information thereto in accordance with the assessment made of an unsatisfactory print, said manually-operable means being actuable to cause a corrected exposure of the color negative presently at the exposure station, and means for checking the synchronism of feeding of the prints to the viewing station with the second passage of the color negatives through the printing machine.

2. Apparatus as defined in claim 1 in which said printing machine comprises means operable by said exposure control means to mark those color negatives measured as unprintable during the first passage of the color negative series, and wherein said means for causing unprintable negatives to be fed straight through said exposure station during the second passage of the color negative series is responsive to such marks.

3. Apparatus as defined in claim 2 in which said printing machine comprises an electrically controllable feed mechanism for passing said color negatives through the machine, and further comprising means for generating signals to start the feed mechanism to bring the color negatives successively into the exposure station.

4. Apparatus as defined in claim 3 in which said feed start signal generating means is coupled to said prints feed means to start the latter in synchronism with said color negative feed mechanism.

5. Apparatus as defined in claim 4 in which said printing machine comprises means for marking said printing paper to denote each print made thereon and said inspection arrangement comprises means for detecting said marks on the printing paper to stop said prints feed means when a print is positioned for inspection at said viewing station.

6. Apparatus as defined in claim 1 in which said manually-operable means are keys.

7. Apparatus as defined in claim 1 in which said printing machine comprises means for sensing a joint in a length of color negative film and means operable by said joint sensing means to place a corresponding mark on said positive printing paper, and said synchronization checking means comprises means adjacent said viewing station such that the direction of feed of said color negaing paper and a gate circuit coupled to said joint-indicating mark detection means and to said joint sensing means for the color negatives to produce a warning signal if a joint and a joint-indicating mark are not coincident.

8. Apparatus as defined in claim 1 in which said color negatives and said prints are transported in the form of webs and further comprising a conveyor arrangement arranged between said exposure station and said viewing station such that the direciton of feed of said color negatives in their second passage through the printing machine is opposite to the direction of feed of said prints, both directions being towards said conveyor arrangement, and the conveyor arrangement having a movement transverse to said feed directions; respective cutting means located on opposite sides of the conveyor to receive the color negatives and prints, said cutting means being operable to cut the respective webs to separate the individual pictures and being arranged to deposit the individual pictures onto the conveyor arrangement.

References Cited

UNITED STATES PATENTS 3,100,419   8/1963   Clapp _____ 355—38

NORTON ANSHER, Primary Examiner

R. L. MOSES, Assistant Examiner

U.S. Cl. X.R.

355—38, 41, 29

UNITED STATES PATENT OFFICE
CERTIFICATE OF CORRECTION

Patent No. 3,516,741          Dated June 23, 1970

Inventor(s)    KURT THADDEY

It is certified that error appears in the above-identified patent and that said Letters Patent are hereby corrected as shown below:

In Claim 7, line 65, the following statement should be cancelled:

-- such that the direction of feed of said color negating paper -- and the following inserted in its place:

-- to detect said joint-indicating marks on said printing paper --

Said claim in part, reading as follows:

-- and said synchronization checking means comprises means adjacent said viewing station to detect said joint-indicating marks on said printing paper and a --

SIGNED AND
SEALED
SEP 22 1970

(SEAL)
Attest:

Edward M. Fletcher, Jr.
Attesting Officer

WILLIAM E. SCHUYLER, JR.
Commissioner of Patents